United States Patent
Mishra et al.

(10) Patent No.: US 12,052,269 B2
(45) Date of Patent: Jul. 30, 2024

(54) SECURE NETWORK COMMUNICATIONS APPARATUS FOR COMMUNICATING SENSITIVE DATA

(71) Applicant: BANK OF AMERICA CORPORATION, Charlotte, NC (US)

(72) Inventors: Amit Mishra, Chennai (IN); Sandeep Verma, Gurugram (IN)

(73) Assignee: Bank of America Corporation, Charlotte, NC (US)

( * ) Notice: Subject to any disclaimer, the term of this patent is extended or adjusted under 35 U.S.C. 154(b) by 376 days.

(21) Appl. No.: 17/705,564

(22) Filed: Mar. 28, 2022

(65) Prior Publication Data
US 2023/0308455 A1 Sep. 28, 2023

(51) Int. Cl.
*H04L 9/40* (2022.01)
*G06Q 20/38* (2012.01)
*G06Q 20/40* (2012.01)

(52) U.S. Cl.
CPC ......... *H04L 63/126* (2013.01); *G06Q 20/389* (2013.01); *G06Q 20/401* (2013.01); *H04L 63/0442* (2013.01); *H04L 63/1433* (2013.01)

(58) Field of Classification Search
CPC .............. H04L 63/126; H04L 63/0442; H04L 63/1433; G06Q 20/389; G06Q 20/401
See application file for complete search history.

(56) References Cited

U.S. PATENT DOCUMENTS

| | | |
|---|---|---|
| 7,970,661 B1 | 6/2011 | Abraham et al. |
| 8,050,968 B2 | 11/2011 | Antonucci et al. |
| 8,249,967 B2 | 8/2012 | Park et al. |
| 8,260,645 B2 | 9/2012 | Banerjee et al. |
| 8,275,704 B2 | 9/2012 | Bishop et al. |
| 8,301,500 B2 | 10/2012 | Pharris |
| 8,355,987 B2 | 1/2013 | Hirson et al. |
| 8,370,265 B2 | 2/2013 | Coulter et al. |
| 8,386,353 B2 | 2/2013 | Hirson et al. |
| 8,401,898 B2 | 3/2013 | Chien et al. |
| 8,412,630 B2 | 4/2013 | Ross et al. |
| 8,566,201 B1 | 10/2013 | Bent et al. |
| 8,566,414 B2 | 10/2013 | Prevost et al. |
| 8,671,385 B2 | 3/2014 | Byrd et al. |
| 8,700,524 B2 | 4/2014 | Williams et al. |
| 9,003,078 B2 | 4/2015 | Browne et al. |
| 9,031,860 B2 | 5/2015 | Winters et al. |
| 9,053,514 B2 | 6/2015 | Bennett et al. |

(Continued)

*Primary Examiner* — Stephen T Gundry

(57) ABSTRACT

A system for performing a network service between a user device, an entity server, and a designated server that uses user sensitive data in the performance of a service subscribed to by the user and offered by the first entity server. The user sensitive data is provided to the designated server. The designated server generates a subscription identifier by encrypting the sensitive data using a public key of a public and private key pair, generated using a public key infrastructure, and issues the encrypted subscription identifier to the user device and the entity server for use in place of the sensitive data. The user device and the entity server use the designated entity server as a proxy for operations that rely upon the actual sensitive data. In these operations, the designated entity server resolves the subscription identifier by decrypting the subscription identifier using a private key of the key pair.

20 Claims, 3 Drawing Sheets

(56) References Cited

U.S. PATENT DOCUMENTS

| | | |
|---|---|---|
| 9,070,127 B2 | 6/2015 | Pitroda et al. |
| 9,141,948 B2 | 9/2015 | Dickelman |
| 9,355,393 B2 | 5/2016 | Purves et al. |
| 9,684,931 B2 | 6/2017 | Keithley |
| 9,818,114 B2 | 11/2017 | Pastore et al. |
| 9,830,597 B2 | 11/2017 | Bondesen et al. |
| 9,892,458 B1 | 2/2018 | Shearer et al. |
| 9,972,004 B1 | 5/2018 | Donavalli et al. |
| 10,013,717 B2 | 7/2018 | Posch et al. |
| 10,043,162 B1 | 8/2018 | Renke et al. |
| 10,275,750 B2 | 4/2019 | Castrechini et al. |
| 10,282,715 B2 | 5/2019 | Brennan et al. |
| 10,397,070 B2 | 8/2019 | Allen et al. |
| 10,402,792 B2 | 9/2019 | Lin et al. |
| 10,467,618 B2 | 11/2019 | White |
| 10,476,974 B2 | 11/2019 | Jones-Mcfadden et al. |
| 10,504,118 B2 | 12/2019 | Ovick et al. |
| 10,607,247 B2 | 3/2020 | Winters et al. |
| 10,949,822 B2 | 3/2021 | Anderson et al. |
| 11,126,979 B2 | 9/2021 | Raj et al. |
| 11,861,590 B1* | 1/2024 | Quigley ............... G06Q 20/352 |
| 11,935,040 B1* | 3/2024 | Dahn ............... G06Q 20/38215 |
| 11,997,213 B2* | 5/2024 | Wang ................... H04L 9/3247 |
| 2014/0279456 A1* | 9/2014 | Browne ............... G06Q 20/145 |
| | | 705/40 |
| 2015/0262165 A1 | 9/2015 | Fisher |
| 2016/0142397 A1 | 5/2016 | Froelich et al. |
| 2016/0292690 A1 | 10/2016 | Faith et al. |
| 2016/0360039 A1 | 12/2016 | Sanghavi et al. |
| 2018/0025442 A1 | 1/2018 | Isaacson et al. |
| 2018/0103086 A1* | 4/2018 | Jones-McFadden ........................ H04L 67/535 |
| 2018/0158049 A1 | 6/2018 | Jackson |
| 2018/0268392 A1 | 9/2018 | Arthur et al. |
| 2018/0330358 A1 | 11/2018 | May et al. |
| 2019/0026755 A1 | 1/2019 | Fordyce, III et al. |
| 2019/0066074 A1 | 2/2019 | Powell |
| 2019/0080421 A1 | 3/2019 | Mclaughlin et al. |
| 2019/0332691 A1 | 10/2019 | Beadles et al. |
| 2021/0081924 A1* | 3/2021 | Jhas .................... G06Q 20/386 |
| 2023/0336512 A1* | 10/2023 | Arora ............... G06F 16/90332 |
| 2023/0344649 A1* | 10/2023 | Zamani ............. G06Q 20/3227 |
| 2023/0379276 A1* | 11/2023 | Roy ..................... H04L 67/306 |
| 2023/0379699 A1* | 11/2023 | Oerton .................. H04L 63/10 |
| 2023/0388314 A1* | 11/2023 | Wilson ................. H04L 63/10 |
| 2024/0098500 A1* | 3/2024 | Pateromichelakis . H04W 12/35 |

\* cited by examiner

SECURE NETWORK COMMUNICATIONS APPARATUS FOR COMMUNICATING SENSITIVE DATA

TECHNICAL FIELD

The present disclosure relates generally to the communication and processing of sensitive data in network systems, and more specifically to a secure network communications apparatus for communicating and processing sensitive data between multiple entities.

BACKGROUND

Network systems are fraught with security risks and quality of service issues due to system complexity and the number of people that have access or potential access to the systems, authorized or not. Network systems are designed to perform network services and, as such, these systems are often used to store, process, and communicate sensitive data when initiating a service, performing a service, and maintaining a service. Each time sensitive data is stored, processed, or communicated, there is an increased security vulnerability in that the data is briefly exposed and, therefore, can be compromised. The security vulnerabilities are heightened when communications are recurring among users and entities, such as when a user has a membership or subscription with a particular entity.

SUMMARY

The present disclosure describes a system, apparatus, and a method of use that eliminates or reduces the use of sensitive data while processing, storing, and communicating data relevant in performing a network service between a user computing device and multiple service provider entities. The system and apparatus are particularly integrated in network systems as a proxy, resolver, and authenticator. The system and apparatus use, e.g., an encrypted identifier in the place of the sensitive data. The sensitive data can be stored by one of the entities and the user computing device and other entities can use the encrypted identifier in its place. In doing so, the system and apparatus improve state of the art network systems by minimizing use of and access to sensitive data associated with the process of performing a network service. As such, an advantage of using the system and apparatus in performing a network service is reduction in security threats and, therefore, a reduction in operating costs. Other advantages include improved sensitive data integrity and authenticity. Improvements to the data integrity can be realized since the actual sensitive data is not used and access to the sensitive data is limited. Improvements to data authenticity can be realized since the entity serving as the proxy, resolver, and authenticator can operate to validate interactive communications, e.g. according to an agreed upon service arrangement. This may be particularly advantageous to a user or an entity wherein duplicate transactions can offset transactional records.

In a practical application, a user computing device and a first entity server use a service of a network system that includes interactive communications between the user computing device, the first entity server, and one or more other entity servers in performing the service. Details of sensitive data belonging to the user are needed by the first entity server and the one or more other entity servers to affect the service. In one embodiment, the service can be operative features of the network system that function to store, process, and communicate data in performing a subscription plan service. For example, if a merchant desires to execute recurring transaction requests with a customer, the merchant can provide certain information about the recurring transactions and the customer to a financial institution. This information can also include subscription information, which will notify the financial institution that the merchants desires to store the customer's card information (e.g., credit card or other payment card) with the intent to perform future transactions with the card on file. The subscription information can include the merchant name; expected transaction amount; subscription identifiers to validate the transaction request; recurrence frequency (e.g., once a week, once a month, once a year, etc.); and public/private key information, among other things depending on the particular implementation. Using the merchant's public key, the financial institution will encrypt transaction information so that the information generated at the financial institution can be decrypted at the merchant's server using the merchant's private key. Based on subscription details, the financial institution generates a subscription identifier for the merchant and shares it in response to the first transaction. The financial institution also provides an interface to customers to view all of the subscription identifiers that are currently active for the customer and their respective conditions. Customers are permitted to edit any terms of condition for these subscriptions using the interface. When a merchant initiates a transaction request using the subscription identifier, then the financial institution will validate the request payload against the subscription parameters, terms and conditions. If any terms and conditions do not meet requirements, then the financial institution will notify the merchant with an error message, or the like, and decline the transaction. In the examples described below, the customer may comprise the user entity, the merchant may comprise the first entity, and the financial institution may comprise the second entity.

In the case of a subscription plan service, the user computing device and the first entity server use the network service to operate based on the details of a subscription plan. The subscription plan involves the user participating in an actionable performance plan provided by the first entity. To perform the service, the sensitive data needs to be communicated between the user computing device, the first entity server, and at least one of the other servers on a periodic basis. In this scenario, one of the other entity servers is designated as the proxy, resolver, and authenticator. The user computing device and the first entity server are configured to use an encrypted identifier in place of the sensitive data in performing operations of the service and interact with the designated entity server when the service calls for the use of the sensitive data. The designated entity server is configured to resolve the encrypted identifier to complete an operation or a step of the operation.

During an initiation stage of the subscription plan service, the sensitive data can be stored at the designated entity server. The designated entity server can generate a subscription plan identifier using the sensitive data or the subscription plan, a public key of a public and private key pair, and an encryption algorithm. The designated entity server can maintain the sensitive data and the subscription plan and the user computing device, the first entity server, the designated server, and any of the other entity servers involved in rendering the service can use the encrypted subscription identifier in performing processing, storing, and communication operations in the performance of the network service. The user computing device, the first entity server, and any of the other entity servers involved in performing the service need not store or use the sensitive data. If the sensitive data is needed, the designated entity server can resolve the encrypted subscription identifier to the subscription plan by decrypting the encrypted subscription identifier using the encrypted subscription identifier, a private key of the public and private key pair, and a decryption algorithm.

Described in greater detail is a system comprising a user processor having a first memory, a first entity processor having a second memory, and a second entity processor having a third memory. The first memory is configured to store a first entity identifier, interaction details (sensitive data), and a subscription indicator. The second memory is configured to store a plurality of subscription plans. The third memory is configured to store the interaction details and a first entity specified subscription plan. The first entity processor and second memory are associated with a first entity server. The second entity processor and third memory are associated with a second entity server.

The user processor is configured to generate a message comprising the first entity identifier, the interaction details, and the subscription indicator, and to send the message to the first entity server associated with the first entity identifier.

The first entity processor is configured to process the message to determine a first entity specified subscription plan, to generate an interaction initiation request message, and to send the interaction initiation request message to a second entity server associated with the interaction details. The interaction initiation request message comprises an initial interaction request, the interaction details, and the first entity specified subscription plan.

The second entity processor is configured to generate a subscription request message comprising the first entity specified subscription plan and send the subscription request message to a user computing device associated with the interaction details.

The user processor of the user computing device is further configured to display the first entity specified subscription plan on the user computing device, generate a confirmation message comprising the first entity specified subscription plan and a user acknowledgment, and send the confirmation message to the second entity server.

The second entity processor is further configured to generate a subscription identifier identifying the first entity specified subscription plan, including any modification, store the subscription identifier and the first entity specified subscription plan in the third memory, and send the subscription identifier to the first entity server associated with the first entity identifier. The subscription identifier is encrypted using a public key of the second entity server.

The first entity processor is further configured to generate periodic interaction messages based on the first entity specified subscription plan and send the periodic interaction messages to the second entity server. Each periodic interaction message comprises a reoccurring interaction request and the subscription identifier.

The second entity processor is further configured to decrypt the subscription identifier of each interaction message using a private key of the second entity server, validate the reoccurring interaction request with the first entity specified subscription plan identified by the decrypted subscription identifier, generate an interaction confirmation message for each interaction message, and send the interaction confirmation message to the first entity server associated with the first entity identifier. The interaction confirmation message confirming an occurrence of an interaction transaction.

In some embodiments, the second entity processor is further configured to generate an interaction notification message comprising the subscription identifier and send the interaction notification message to the user computing device. The user processor is further configured to process the interaction notification message to identify the first entity specified subscription plan and store the subscription identifier and the first entity specified subscription plan in the first memory.

In other embodiments, the second entity processor is further configured to generate an interaction notification message for each interaction message and send the interaction notification message to the user computing device. The interaction notification message comprises the subscription identifier.

In yet other embodiments, the user processor is further configured to process the interaction notification message to identify the first entity specified subscription plan, generate an interaction notification response message, and send the interaction notification response message to the second entity server. The interaction notification message comprises a request to authorize the interaction message. The interaction notification response message comprises the subscription identifier and a response to the request to authorize the interaction message.

In still yet other embodiments, the user processor is further configured to process the interaction notification message to identify the first entity specified subscription plan and store the interaction notification message using the first entity specified subscription plan. The interaction notification message confirms the occurrence of the interaction transaction.

In yet additional embodiments, the user processor is further configured to process the subscription request message to determine the first entity specified subscription plan, modify the first entity specified subscription plan associated with the interaction details, and display the modified first entity specified subscription plan. The confirmation message comprises the modified first entity specified subscription plan.

Certain embodiments of this disclosure may include some, all, or none of these advantages. These advantages and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

Figure 1:
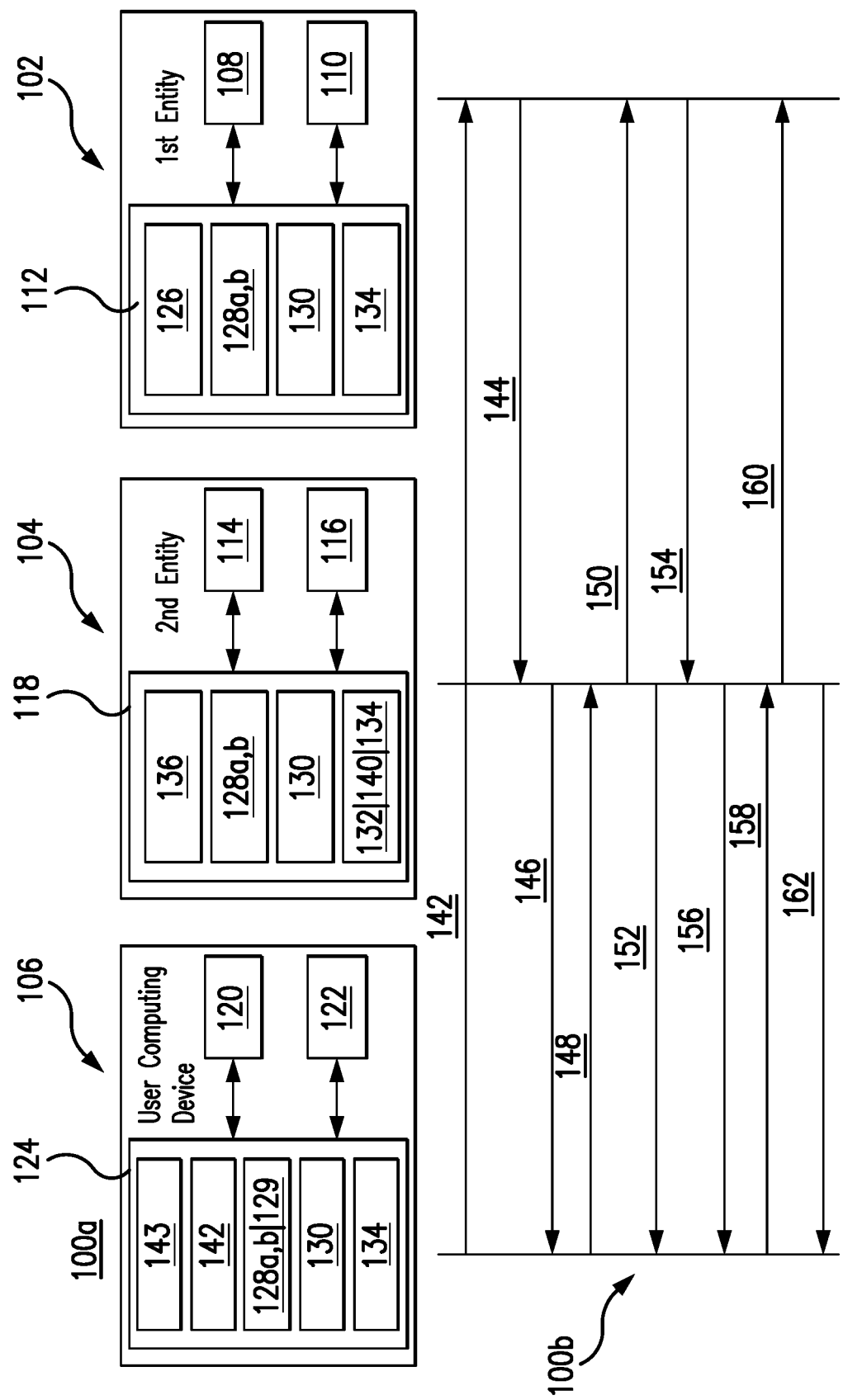
FIG. 1 illustrates a system and signaling diagram for securely storing, processing, and communicating sensitive data between multiple entities in a network system, according to example embodiments.
Figure 2A:
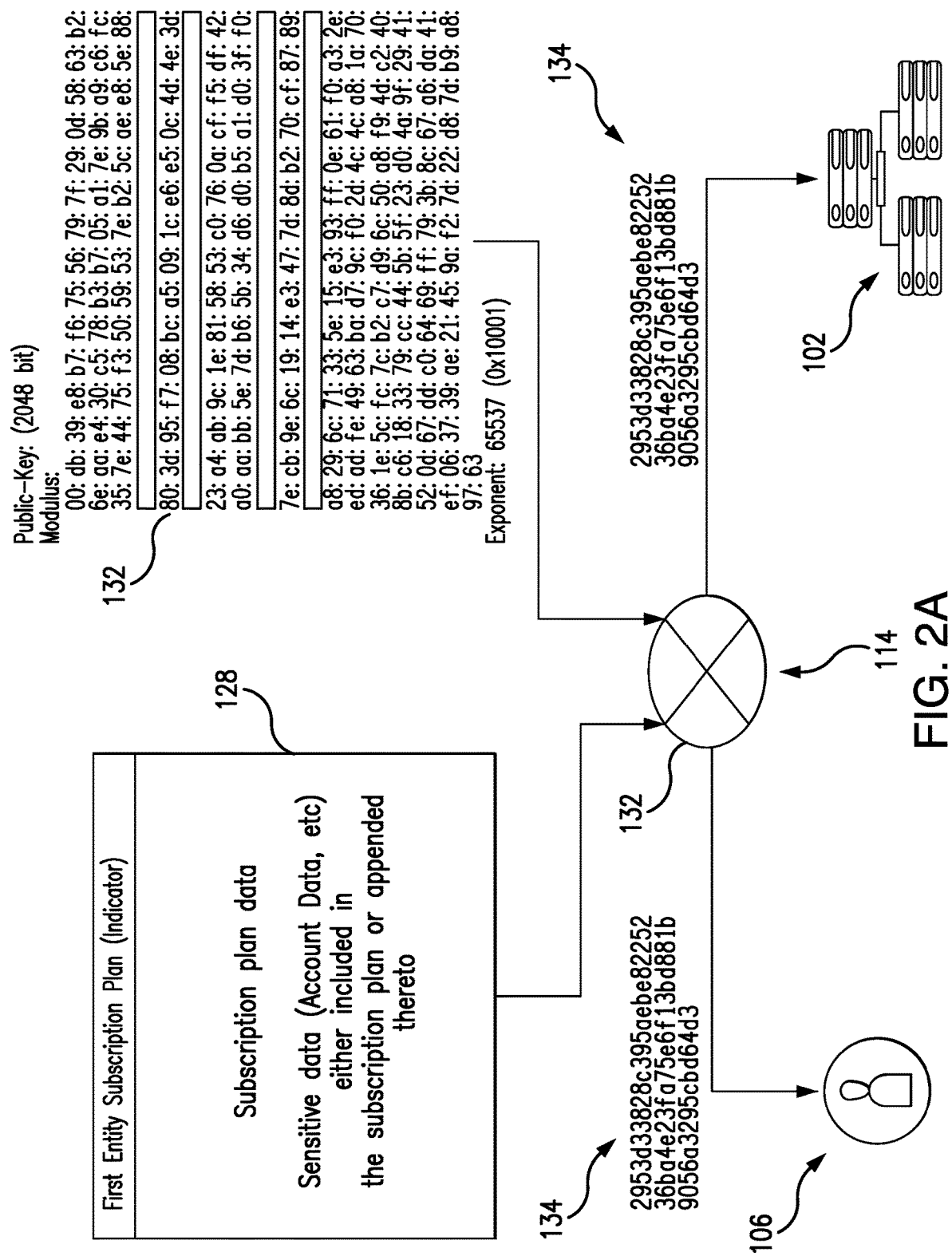
FIGS. 2A and 2B illustrate a processing device, of one of the entities in the network system, that generates and encrypts a subscription identifier for use in place of sensitive data and functions as a proxy, resolver, an authenticator in rendering a network service, according to example embodiments.
Figure 2B:
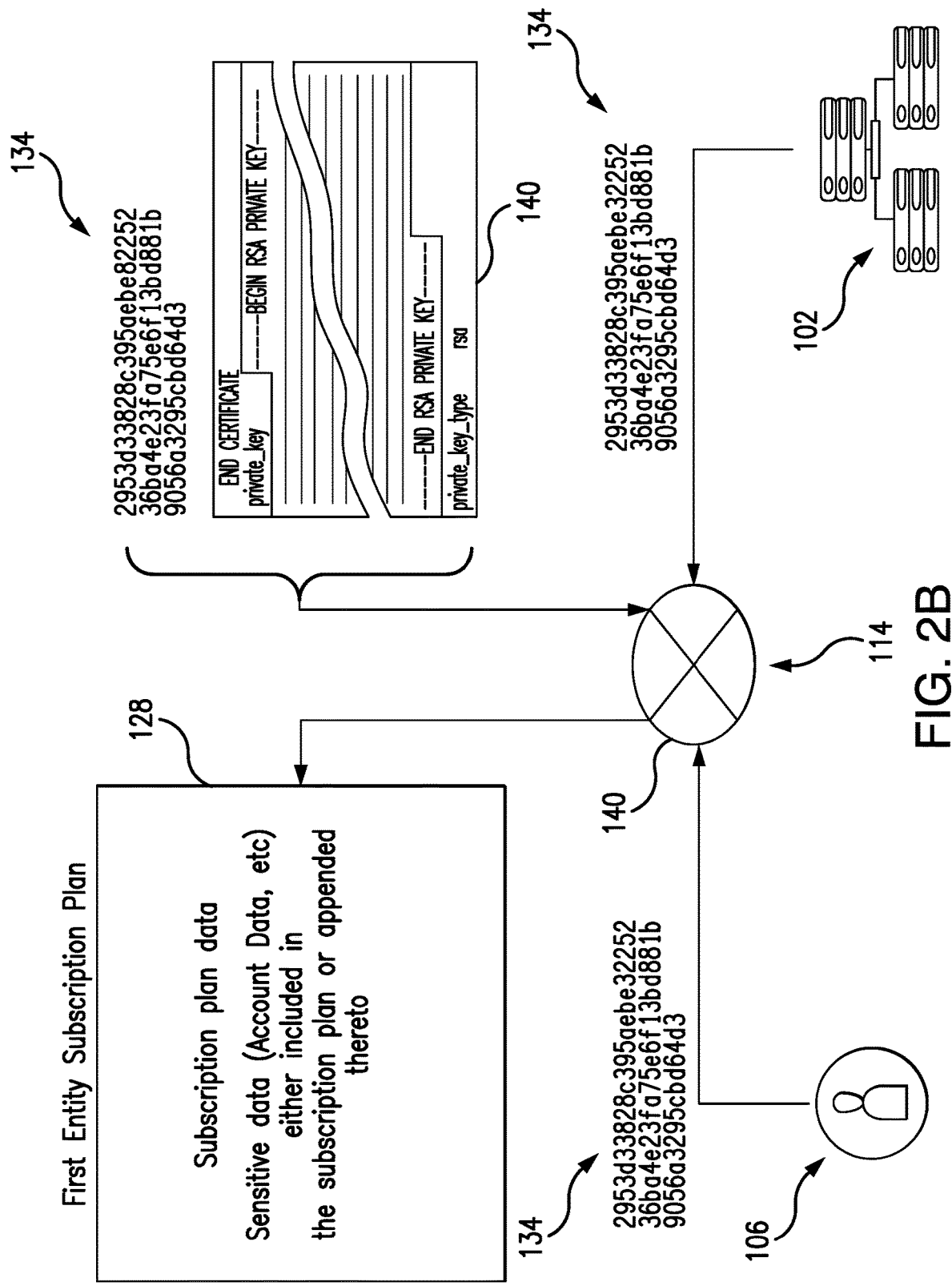

As described above, previous technologies fail to maintain the security and integrity of sensitive data used in performing network services. This disclosure addresses those limitations. FIG. 1 illustrates an example embodiment of a system 100a, and a signaling diagram (method) 100b, for storing, processing, and communicating sensitive data between a first entity server 102, a second entity server 104, and a user computing device 106. FIGS. 2A and 2B illustrate an example embodiment of a processing device of the second entity server 104 and its role as a proxy, resolver, and authenticator during the performance of a service.

Example System, Apparatus, and Method to Store, Securely Process, and Communicate Sensitive Data Between Entities in a Network System Referring to FIG. 1, the system 100a comprises a first entity server 102, a second entity server 104, and a user computing device 106. In general, system 100 performs an application service using the second entity server 104 as a network entity for securely storing sensitive data and a proxy, resolver, and authenticator of interactive data communicated between the first entity server 102 and the user computing device 106 during the rendering of the application service.

The first entity server 102 comprises a first entity processor 108, network interface 110, first entity memory 112, instruction set 126, (modified) subscription plans 128a and 128b, interaction details (sensitive data) 130, and encrypted subscription identifier 134. In a particular use case, the first entity server 102 is associated with a merchant. The second entity server 104 comprises a second entity processor 114, a network interface 116, second entity memory 118, an instruction set 136, interaction details 130, a public key 132, a private key 140, and an encrypted subscription identifier 134. In a particular use case, the second entity server 104 is associated with a financial institution. The user computing device 106 comprises a user processor 120, a network interface 122, user computing device memory 124, an instruction set 142, a first entity identifier 143, (modified) subscription plans 128a and 128b, interaction details 130, and an encrypted subscription identifier 134. In a particular use case, the user computing device 106 is associated with a customer of a merchant.

Second entity server 104 includes an instruction driven processing device that is used to eliminate or reduce communication of sensitive data in a plurality of interaction messages, reduce the number of locations the sensitive data is stored, and maintain the integrity and authenticity of the interaction messages based on the subscription plan 128a or 128b. In an example use case, the interaction messages and sensitive data may initiate a network service and maintain the network service between the first entity server 102 and the user computing device 106 over a period according to a service agreement, e.g. interaction initiation messages to initiate a transaction service that involves the use of sensitive data in rendering the service and subsequent interaction messages to perform the same at scheduled times.

The processing device of the second entity server 104 can be a resolver and a proxy to the first entity server 102 and the user computing device 106. The second entity server 104 generates an identifier, e.g. based on the interaction details 130, the subscription plan 128, or any other information that can be associated with the interaction details 130 and the subscription plan 128, issues the number to the first entity server 102 and user device 106 for replacement of and use instead of the sensitive data. The identifier can be a hashed identifier or an encrypted identifier, e.g. generated using the public key infrastructure. In the case of the public key infrastructure, the public key 132 and the private key 140 can be generated using address information of the second entity server 104 and the interaction details 130 or the subscription plan 128. During commissioning of the service, the second entity server 104 can be used as a proxy in the processing and communication of the interaction messages, a resolver for resolution of the generated number and the sensitive data, and an authenticator of the interaction messages according to the subscription plan 128a or 128b.

Further detail is provided in the section below entitled "operational flow of system and device for storing and securely processing sensitive data between entities in a network system."

A method of using the second entity server 104 as a proxy, resolver, and a authenticator for the first entity server 102 and the user computing device 106 is illustrated by the signaling diagram 100b in FIG. 1. The signaling diagram 100b comprises a plurality of messages generated by, sent by, and received by the first entity server 102, the second entity server 104, and the user computing device 106.

First entity server 102 sends interaction initiation request messages 144, periodic interaction messages 154 and receives messages 142, subscription identifier messages 150, and interaction confirmation messages 160. Second entity server 104 sends subscription request messages 146, subscription identifier messages 150, interaction notification messages 152, interaction notification messages 156, 162, and interaction confirmation messages 160. The second entity server 104 receives interaction initiation request messages 144, confirmation messages 148, and interaction notification response messages 158. User computing device 106 sends messages 142, confirmation messages 148, and interaction notification response messages 158. User computing device 106 receives subscription request messages 146, interaction notification messages 152, and interaction notification messages 156, 162.

Additional details of the method and signaling diagram 100b can be found in the section below entitled "Example method for communicating sensitive data between entities in a network system."

System Components
User Computing Device, First Entity Server, Second Entity Server, and Messages First entity server 102, second entity server 104, and user computing device 106 are devices that are configured to store data, process data, and communicate data in a network system. The first entity server 102, the second entity server 104, and the user computing device 106 are devices generally configured as parts of a network system and configured as functioning parts of a service associated therewith. The first entity server 102 is a device generally configured to use a numeric identifier in place of sensitive data in the performance of the service. The second entity server 104 is a device generally configured to generate a numeric identifier based on a hash and sensitive data, process interaction messages communicated between the first entity server 102 and the user computing device 106, and resolve the numeric identifier and the sensitive data in the performance of the service. The user computing device 106 is a device generally configured to use a numeric identifier in place of sensitive data in the performance of the service.

First Entity Server

The processor 108 is in signal communication with the network interface 110 and the memory 112. Memory 112 is configured to store software instruction set 126 that when executed by the processor 108, causes the processor 108 to perform one or more functions described herein. The processor 108 may be configured as shown, or in any other configuration.

The processor 108 comprises any electronic circuitry, including, but not limited to, state machines, one or more central processing unit (CPU) chips, logic units, cores (e.g., a multi-core processor), field-programmable gate arrays (FPGAs), application-specific integrated circuits (ASICs), or digital signal processors (DSPs). The processor 108 may be a programmable logic device, a microcontroller, a microprocessor, or any suitable combination of the preceding. The processor 108 is communicatively coupled to and in signal communication with the network interface 110 and memory 112. The processor 108 is configured to process data and may be implemented in hardware or software. For example, the processor 108 may be 8-bit, 16-bit, 32-bit, 64-bit, or of any other suitable architecture. The processor 108 may include an arithmetic logic unit (ALU) for performing arithmetic and logic operations, processor registers that supply operands to the ALU and store the results of ALU operations, and a control unit that fetches instructions from memory and executes them by directing the coordinated operations of the ALU, registers and other components. The processor is configured to implement various instructions. For example, the processor 108 is configured to execute software instruction set 126 to implement the functions disclosed herein, such as some or all of those described with respect to FIGS. 1-2. In some embodiments, the functions described herein are implemented using logic units, FPGAs, ASICs, DSPs, or any other suitable hardware or electronic circuitry.

The network interface 110 is configured to enable wired and/or wireless communications. The network interface 110 is configured to communicate data between the memory 112 and other network devices, systems, or domain(s). For example, the network interface 110 may comprise a WIFI interface, a local area network (LAN) interface, a wide area network (WAN) interface, a modem, a switch, or a router. The processor 108 is configured to send and receive data using the network interface 110 and memory 112. The network interface 110 may be configured to use any suitable type of communication protocol.

Memory 112 may be volatile or non-volatile and may comprise a read-only memory (ROM), random-access memory (RAM), ternary content-addressable memory (TCAM), dynamic random-access memory (DRAM), and static random-access memory (SRAM). Memory 112 may be implemented using one or more disks, tape drives, solid-state drives, and/or the like. Memory 112 is operable to store the instruction set 126, (modified) subscription plans 128a and 128b, interaction details 130, and encrypted subscription identifier 134, and/or any other data or instructions. The software instruction set 126 may comprise any suitable set of instructions, logic, rules, or code operable to execute the processor 108.

The Second Entity Server

The processor 114 is in signal communication with the network interface 116 and the memory 118. Memory 118 is configured to store software instruction set 136 that when executed by the processor 114, causes the processor 114 to perform one or more functions described herein. The processor 114 may be configured as shown, or in any other configuration.

The processor 114 comprises any electronic circuitry, including, but not limited to, state machines, one or more central processing unit (CPU) chips, logic units, cores (e.g., a multi-core processor), field-programmable gate arrays (FPGAs), application-specific integrated circuits (ASICs), or digital signal processors (DSPs). The processor 114 may be a programmable logic device, a microcontroller, a microprocessor, or any suitable combination of the preceding. The processor 114 is communicatively coupled to and in signal communication with the network interface 116 and memory 118. The processor 114 is configured to process data and may be implemented in hardware or software. For example, the processor 114 may be 8-bit, 16-bit, 32-bit, 64-bit, or of any other suitable architecture. The processor 114 may include an arithmetic logic unit (ALU) for performing arithmetic and logic operations, processor registers that supply operands to the ALU and store the results of ALU operations, and a control unit that fetches instructions from memory and executes them by directing the coordinated operations of the ALU, registers and other components. The processor 114 is configured to implement various instructions. For example, the processor 114 is configured to execute software instruction set 136 to implement the functions disclosed herein, such as some or all of those described with respect to FIGS. 1-2. In some embodiments, the functions described herein are implemented using logic units, FPGAs, ASICs, DSPs, or any other suitable hardware or electronic circuitry.

The network interface 116 is configured to enable wired and/or wireless communications. The network interface 116 is configured to communicate data between the memory 118 and other network devices, systems, or domain(s). For example, the network interface 116 may comprise a WIFI interface, a local area network (LAN) interface, a wide area network (WAN) interface, a modem, a switch, or a router. The processor 114 is configured to send and receive data using the network interface 116 and memory 118. The network interface 116 may be configured to use any suitable type of communication protocol.

Memory 118 may be volatile or non-volatile and may comprise a read-only memory (ROM), random-access memory (RAM), ternary content-addressable memory (TCAM), dynamic random-access memory (DRAM), and static random-access memory (SRAM). Memory 118 may be implemented using one or more disks, tape drives, solid-state drives, and/or the like. Memory 118 is operable to store the instruction set 136, (modified) subscription plans 128a and 128b, interaction details 130, public key 132, private key 140, encrypted subscription identifier 134, and/or any other data or instructions. The software instruction set 136 may comprise any suitable set of instructions, logic, rules, or code operable to execute the processor 114.

User Computing Device

The processor 120 is in signal communication with the network interface 122 and the memory 124. Memory 124 is configured to store software instruction set 142 that when executed by the processor 120, causes the processor 120 to perform one or more functions described herein. The processor 120 may be configured as shown, or in any other configuration.

The processor 120 comprises any electronic circuitry, including, but not limited to, state machines, one or more central processing unit (CPU) chips, logic units, cores (e.g., a multi-core processor), field-programmable gate arrays (FPGAs), application-specific integrated circuits (ASICs), or digital signal processors (DSPs). The processor 120 may be a programmable logic device, a microcontroller, a microprocessor, or any suitable combination of the preceding. The processor 120 is communicatively coupled to and in signal communication with the network interface 122 and memory 124. The processor 120 is configured to process data and may be implemented in hardware or software. For example, the processor 120 may be 8-bit, 16-bit, 32-bit, 64-bit, or of any other suitable architecture. The processor 120 may include an arithmetic logic unit (ALU) for performing arithmetic and logic operations, processor registers that supply operands to the ALU and store the results of ALU operations, and a control unit that fetches instructions from memory and executes them by directing the coordinated operations of the ALU, registers and other components. The processor 120 is configured to implement various instructions. For example, the processor 120 is configured to execute software instruction set 142 to implement the functions disclosed herein, such as some or all of those described with respect to FIGS. 1-2. In some embodiments, the functions described herein are implemented using logic units, FPGAs, ASICs, DSPs, or any other suitable hardware or electronic circuitry.

The network interface 122 is configured to enable wired and/or wireless communications. The network interface 122 is configured to communicate data between the memory 124 and other network devices, systems, or domain(s). For example, the network interface 122 may comprise a WIFI interface, a local area network (LAN) interface, a wide area network (WAN) interface, a modem, a switch, or a router. The processor 120 is configured to send and receive data using the network interface 122 and memory 124. The network interface 122 may be configured to use any suitable type of communication protocol.

Memory 124 may be volatile or non-volatile and may comprise a read-only memory (ROM), random-access memory (RAM), ternary content-addressable memory (TCAM), dynamic random-access memory (DRAM), and static random-access memory (SRAM). Memory 124 may be implemented using one or more disks, tape drives, solid-state drives, and/or the like. Memory 124 is operable to store the (modified) subscription plans 128*a* and 128*b*, interaction details 130, encrypted subscription identifier 134, and/or any other data or instructions. The software instruction set 142 may comprise any suitable set of instructions, logic, rules, or code operable to execute the processor 120.

Messages

The messages 142 comprise first entity identifier 143, interaction details 130, and a subscription indicator 129. The interaction initiation request messages 144 comprise an initial interaction request, the interaction details 130, and the first entity specified subscription plan 128, the subscription indicator 129, or both. The subscription request messages 146 comprise the first entity specified subscription plan 128, the subscription indicator 129, or both. The confirmation messages 148 comprise the first entity specified subscription plan 128*a* or the modified first entity specified subscription plan 128*b*. The subscription identifier messages 150 comprise the subscription identifier 134. The interaction notification messages 152 comprise the subscription identifier 134. The periodic interaction messages 154 comprise a reoccurring interaction request and the subscription identifier 134. The interaction notification messages 156 comprise a request to authorize the interaction message 154. The interaction notification response messages 158 comprises the subscription identifier 134 and a response to the request to authorize the interaction message 154. The interaction confirmation messages 160 confirm an occurrence of an interaction transaction. The interaction notification messages 162 confirm the occurrence of the interaction transaction. The interaction notification messages 156, 162 both comprise the subscription identifier 134.

Operational Flow of System and Device for Storing and Securely Processing Sensitive Data Between Entities in a Network System User Computing Device and First Entity Subscription Indicator Referring to FIG. 1, system 100, and FIGS. 2A-2B, the first memory 124 comprises the first entity identifier 143, the interaction details 130, and the subscription indicator 129. The first entity identifier 143 is a network address or name that can be resolved to a network address. The interaction details 130 comprises sensitive data of which mishandling can compromise its integrity and authenticity. The subscription indicator 129 is a code associated with a subscription plan that can be used to specify a first entity subscription plan 128. The user processor 120 generates a message 142 and encodes the message 142 with the first entity identifier 143, the interaction details 130, and the subscription indicator 129. The user processor 120 sends the message 142 to the first entity server 102 associated with the first entity identifier 143.

The first entity processor 108 processes the message 142 and uses the subscription indicator 129 to determine the associated subscription plan, the first entity specified subscription plan 128, from one or more subscription plans stored in the second memory 112. The first entity processor 8 generates the interaction initiation request message 144. The first entity processor 108 sends the interaction initiation request message 144 to the second entity server 104 associated with the interaction details 130.

The second entity processor 114 generates a subscription request message 146 comprising the first entity specified subscription plan 128 and sends the subscription request message 146 to the user computing device 106 associated with the interaction details 130. The second entity processor 114 stores the interaction details 130 and the first entity specified subscription plan 128 in memory 118.

The user processor 120 displays the first entity specified subscription plan 128 on the user computing device 106. The user processor 120 generates a confirmation message 148 and sends the confirmation message 148 to the second entity server 104.

The second entity processor 114 generates a subscription identifier 134 identifying the first entity specified subscription plan 128. The subscription identifier 134 can be encrypted using a public key 132 of a public and private key pair. The second entity processor 114 stores the encrypted subscription identifier 134 and the first entity specified subscription plan 128 in memory 118. The second entity processor 114 sends the subscription identifier message 150 to the first entity server 102 associated with the first entity identifier 143.

The first entity processor 108 generates periodic interaction messages 154 based on the first entity specified subscription plan 128 and sends the periodic interaction messages 154 to the second entity server 104.

The second entity processor 114 decrypts the subscription identifier 134 of each interaction message 154 using a private key 140 of the public and private key pair associated with the second entity server 104. The second entity processor 114 validates the reoccurring interaction request with the first entity specified subscription plan 128 identified by the decrypted subscription identifier. The second entity processor 114 generates an interaction confirmation message 160 for each interaction message 154 and sends the interaction confirmation message 160 to the first entity server 102 associated with the first entity identifier 143.

In some embodiments, the second entity processor 114 generates an interaction notification message 152 comprising the subscription identifier 134 and sends the interaction notification message 152 to the user computing device 106. The user processor 120 processes the interaction notification message 152 to identify the first entity specified subscription plan 128 and stores the encrypted subscription identifier 134 and the first entity specified subscription plan 128 in memory 124.

In other embodiments, the second entity processor 114 generates an interaction notification message 156 or 162 for each interaction message 154 and sends the interaction notification message 156 or 162 to the user computing device 106.

In additional embodiments, the user processor 120 processes the interaction notification message 156 to identify the first entity specified subscription plan 128, generates an interaction notification response message 158, and sends the interaction notification response message 158 to the second entity server 104.

In further embodiments, the user processor 120 processes the interaction notification message 162 to identify the first entity specified subscription plan 128 and stores the interaction notification message 162 using the first entity specified subscription plan 128.

In yet further embodiments, the user processor 120 processes the subscription request message 146 to determine the first entity specified subscription plan 128, modifies the first entity specified subscription plan 128 associated with the interaction details 130, and displays the modified first entity specified subscription plan 128b. The user processor 120 generates a confirmation message 148 and sends the confirmation message 148 to the second entity server 4.

FIGS. 2A and 2B illustrate perspective views of the second entity processor 114 in relation to the first entity server 102 and the user computing device 106 in its role as a proxy, resolver, and authenticator, according to example embodiments. The second entity processor 114 stores interaction details 130 that are included in or associated with the subscription plan 128. The second entity processor 114 can use the subscription plan 128, the interaction details 130, component parts thereof, or any combination thereof to generate a resolvable identifier capable of identifying the interaction details 130. The resolvable identifier can be disseminated to the first entity server 102, the user computing device 106, and any other entities participating in a network service. The second entity processor 114 of the second entity server 104 can then function as a proxy and resolver for the first entity server 102, the user computing device 106, and any other entities.

In a subscription plan service application involving a customer (associated with user computing device 106) and a merchant (associated with first entity server 102), the subscription plan 128 may include an actionable and serviceable agreement between the customer and the merchant that defines terms of an agreed upon payment schedule for a commercial transaction. A bank (associated with the second entity processor 114), for this type of application, operates as a proxy and a resolver with respect to the first entity server 102 and user computing device 106.

The first entity server 102 and the user computing device 106 use the encrypted subscription identifier 134 to conduct interactive transactions based on terms of the subscription plan 128 agreed upon by the customer and the merchant. The first entity server 102 and the user computing device 106 use the second entity processor 114 as a proxy for transactions that require the use of the interaction details 130. The second entity processor 114 resolves the encrypted subscription identifier 134 to facilitate the interactive transactions between the customer and the merchant, approve or decline customer or merchant issued payments transactions based on the subscription plan 128, and facilitate payment transactions between the customer and merchant, or rather their financial institutions.

For this type of application, the second entity processor 114 is configured to operate as a proxy after receiving the interaction initiation request message 144 from the first entity server 102. The second entity processor 114 sends the first entity specified subscription plan 128 to the user computing device 106. The user computing device 106 responds to the second entity processor 114 with the confirmation message 148 comprising the user acknowledgment.

The second entity processor 114 uses the public key 132 of a public and private key pair and the interaction details 130 or the specified subscription plan 128 to generate the encrypted subscription identifier 134. It should be understood that other encryption techniques or hashing techniques than those found in the public key infrastructure can also be used. The second entity processor 114 stores the initial interaction request, the interaction details 130, the first entity specified subscription plan 128, and the encrypted subscription identifier 134 in memory 118 of the second entity server 104.

The first entity server 102 and the user computing device 106 can remove the interaction details 130 from the first memory 124 and the second memory 112 since the encrypted subscription identifier 134 can be used by the second entity server 104 to resolve to any associated information. Any processing that require the use of the interaction details 130 can be proxied to the second entity processor 114 of the second entity server 104.

The second entity processor 114 receives the subscription identifier 134 from the user computing device 106 in interaction notification response messages 158 and from the first entity server 102 in periodic interaction messages 154. The second entity processor 114 resolves the subscription identifier 134 to the first entity subscription plan 128 or the interaction details 130 by decrypting the subscription identifier 134 using the private key 140 of the public and private key pair generated using the public key infrastructure.

The first entity server 102 receives the subscription identifier 134 in the subscription identifier message 150 and the interaction confirmation message 160. The user computing device 6 receives the subscription identifier 134 in the interaction notification messages 152, 156, and 162. The first entity server 102 and the user computing device 106 can store the first entity subscription plan 128 and the subscription identifier 134 upon receipt and use the subscription identifier 134 as an index to locate the subscription plan 128 upon receipt of further communications.

Example Method for Communicating Sensitive Data Between Entities in a Network System In a use case service arrangement, a subscription plan may include an actionable and serviceable agreement between a customer (associated with user computing device 106) and a merchant (associated with first entity server 102) that defines terms of an agreed upon payment schedule for a commercial transaction. A bank (associated with the second entity processor 114), for this type of application, operates as a proxy, resolver, and authenticator with respect to the first entity server 102 and user computing device 106.

The first entity server 102 and the user computing device 106 use the encrypted subscription identifier 134 to conduct interactive transactions based on terms of the subscription plan 128 agreed upon by the customer and the merchant. The first entity server 102 and the user computing device 106 use the second entity processor 114 as a proxy for transactions that require the use of the interaction details 130. The second entity processor 114 resolves the encrypted subscription identifier 134 to facilitate the interactive transactions between the customer and the merchant, approve or decline customer or merchant issued payments transactions based on the subscription plan, and facilitate payment transactions between the customer and merchant, or rather their financial institutions.

In reference to the signaling diagram 100b of FIG. 1, the user computing device 106 generates a message 142 comprising a subscription indicator 129, e.g. an actual subscription plan or a number associated therewith, and interaction details 130 and communicates the message 142 to the first entity processor 108 through the network interface 122. The first entity processor 108 processes the message 142 to determine a first entity specified subscription plan 128 and generates an interaction initiation request message 144. The interaction initiation request message 144 comprises an initial interaction request, the interaction details 130, and the first entity specified subscription plan 128. The first entity processor 108 sends the interaction initiation request message 144 to the second entity processor 114 of the second entity server 104 associated with the interaction details 130. The second entity processor 114 generates a subscription request message 146 comprising the first entity specified subscription plan 128 and sends the message 146 to the user processor 120 associated with the interaction details 130.

The user processor 120 displays the first entity specified subscription plan 128 on the user computing device 106. The user processor 120 generates a confirmation message 148 comprising the first entity specified subscription plan 128 and a user acknowledgement or the confirmation message 148 comprising one or more modification to the first entity specified subscription plan 128 and the user acknowledgment. The user processor 120 sends the confirmation message 148 to the second entity processor 114 of the second entity server 104.

The second entity processor 114 generates a subscription identifier 134 identifying the first entity specified subscription plan 128. The subscription identifier 134 can be encrypted using a public key 132 of the second entity server 104. The second entity processor 114 stores the subscription identifier 134 and the first entity specified subscription plan 128, e.g., in memory 118 of the second entity server 104. The second entity processor 114 sends a subscription identifier message 150 comprising the subscription identifier 134 to the first entity processor 108 of the first entity server 102 associated with the first entity identifier 143. In some embodiments, the second entity processor 114 generates an interaction notification message 152 comprising the subscription identifier 134 and sends the interaction notification message 152 to the user processor 120 of the user computing device 106. The user processor 120 processes the interaction notification message 152 to identify the first entity specified subscription plan 128 and stores the subscription identifier 134 and the first entity specified subscription plan 128 in memory 124 of the user computing device 6.

The first entity processor 108 generates periodic interaction messages 154 based on the first entity specified subscription plan 128, or the modified version, and sends the periodic interaction messages 154 to the second entity processor 114 of the second entity server 104. Each periodic interaction message 154 comprises a reoccurring interaction request and the subscription identifier 134.

The second entity processor 114 decrypts the subscription identifier 134 of each interaction message 154 using a private key 140 of the second entity server 104 and validates the reoccurring interaction request with the first entity specified subscription plan 128 identified by the decrypted subscription identifier. The second entity processor 114 generates an interaction notification message 156 for each interaction message 154 and sends the interaction notification message 156 to the user processor 120. The interaction notification message 156 comprises the subscription identifier 134.

In some embodiments, the user processor 120 processes the interaction notification message 156 to identify the first entity specified subscription plan 128, generates an interaction notification response message 158, and sends the interaction notification response message 158 to the second entity processor 114. In this embodiment, the interaction notification message 156 comprises a request to authorize the interaction message 154 and the interaction notification response message 158 comprises the subscription identifier 134 and a response to the request to authorize the interaction message 154.

The second entity processor 114 generates an interaction confirmation message 160 for each interaction message 154. The interaction confirmation message 160 confirms an occurrence of an interaction transaction. The second entity processor 114 sends the interaction confirmation message 160 to the first entity processor 108 of the first entity server 102 associated with the first entity identifier 143. The second entity processor 114 can also generate another interaction notification message 162 for each interaction message 154 and send the interaction notification message 162 to the user processor 120 of the user computing device 106. The interaction notification message 162 comprises the subscription identifier 134. The user processor 120 can store the interaction notification message 162 using the first entity specified subscription plan 128.

While several embodiments have been provided in the present disclosure, the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated with another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

To aid the Patent Office, and any readers of any patent issued on this application in interpreting the claims appended hereto, applicants note that they do not intend any of the appended claims to invoke 35 U.S.C. § 112(f) as it exists on the date of filing hereof unless the words "means for" or "step for" are explicitly used in the particular claim.

What is claimed is:

1. A method, comprising:

generating a message comprising a first entity identifier, interaction details, and a subscription indicator;

sending the message to a first entity server associated with the first entity identifier;

processing the message to determine a first entity specified subscription plan;

generating an interaction initiation request message, the interaction initiation request message comprising an initial interaction request, the interaction details, and the first entity specified subscription plan;

sending the interaction initiation request message to a second entity server associated with the interaction details;

generating a subscription request message comprising the first entity specified subscription plan;

sending the subscription request message to a user computing device associated with the interaction details;

displaying the first entity specified subscription plan on the user computing device;

generating a confirmation message comprising the first entity specified subscription plan and a user acknowledgement;

sending the confirmation message to the second entity server;

generating a subscription identifier identifying the first entity specified subscription plan, the subscription identifier encrypted using a public key of the second entity server;

storing the subscription identifier and the first entity specified subscription plan on the second entity server;

sending the subscription identifier to the first entity server associated with the first entity identifier;

generating periodic interaction messages based on the first entity specified subscription plan, each periodic interaction message comprising a reoccurring interaction request and the subscription identifier;

sending the periodic interaction messages to the second entity server;

decrypting the subscription identifier of each interaction message using a private key of the second entity server;

validating the reoccurring interaction request with the first entity specified subscription plan identified by the decrypted subscription identifier;

generating an interaction confirmation message for each interaction message, the interaction confirmation message confirming an occurrence of an interaction transaction; and sending the interaction confirmation message to the first entity server associated with the first entity identifier.

2. The method of claim 1, further comprising:

generating an interaction notification message comprising the subscription identifier;

sending the interaction notification message to the user computing device;

processing the interaction notification message to identify the first entity specified subscription plan; and storing the subscription identifier and the first entity specified subscription plan on the user computing device.

3. The method of claim 1, further comprising:

generating an interaction notification message for each interaction message, the interaction notification message comprising the subscription identifier; and sending the interaction notification message to the user computing device.

4. The method of claim 3, further comprising:

processing the interaction notification message to identify the first entity specified subscription plan, the interaction notification message comprising a request to authorize the interaction message;

generating an interaction notification response message, the interaction notification response message comprising the subscription identifier and a response to the request to authorize the interaction message; and sending the interaction notification response message to the second entity server.

5. The method of claim 3, further comprising:

processing the interaction notification message to identify the first entity specified subscription plan, wherein the interaction notification message confirms the occurrence of the interaction transaction; and storing the interaction notification message using the first entity specified subscription plan.

6. The method of claim 1, further comprising:

processing the subscription request message to determine the first entity specified subscription plan;

modifying the first entity specified subscription plan associated with the interaction details; and displaying the modified first entity specified subscription plan on the user computing device;

wherein the confirmation message comprises the modified first entity specified subscription plan.

7. The method of claim 6, wherein the interaction notification message confirms the occurrence of the interaction transaction.

8. A system, comprising:

a first memory configured to store a first entity identifier, interaction details, and a subscription indicator;

a user processor communicatively coupled to the first memory and configured to:

generate a message comprising the first entity identifier, the interaction details, and the subscription indicator;

send the message to a first entity server associated with the first entity identifier;

a second memory configured to store a plurality of subscription plans;

a first entity processor associated with the first entity server and communicatively coupled to the second memory, the first entity processor configured to:

process the message to determine a first entity specified subscription plan;

generate an interaction initiation request message, the interaction initiation request message comprising an initial interaction request, the interaction details, and the first entity specified subscription plan;

send the interaction initiation request message to a second entity server associated with the interaction details;

a third memory configured to store the interaction details and the first entity specified subscription plan;

a second entity processor associated with the second entity server and communicatively coupled to the third memory, the second entity processor configured to:

generate a subscription request message comprising the first entity specified subscription plan; and send the subscription request message to a user computing device associated with the interaction details;

the user processor further configured to:

display the first entity specified subscription plan on the user computing device;

generate a confirmation message comprising the first entity specified subscription plan and a user acknowledgment;
send the confirmation message to the second entity server;
the second entity processor further configured to:
generate a subscription identifier identifying the first entity specified subscription plan, the subscription identifier encrypted using a public key of the second entity server;
store the subscription identifier and the first entity specified subscription plan in the third memory;
send the subscription identifier to the first entity server associated with the first entity identifier;
the first entity processor further configured to:
generate periodic interaction messages based on the first entity specified subscription plan, each periodic interaction message comprising a reoccurring interaction request and the subscription identifier;
send the periodic interaction messages to the second entity server;
the second entity processor further configured to:
decrypt the subscription identifier of each interaction message using a private key of the second entity server;
validate the reoccurring interaction request with the first entity specified subscription plan identified by the decrypted subscription identifier;
generate an interaction confirmation message for each interaction message, the interaction confirmation message confirming an occurrence of an interaction transaction; and
send the interaction confirmation message to the first entity server associated with the first entity identifier.

9. The system of claim 8, wherein the second entity processor is further configured to:
generate an interaction notification message comprising the subscription identifier; and
send the interaction notification message to the user computing device;
wherein the user processor is further configured to:
process the interaction notification message to identify the first entity specified subscription plan; and
store the subscription identifier and the first entity specified subscription plan in the first memory.

10. The system of claim 8, wherein the second entity processor is further configured to:
generate an interaction notification message for each interaction message, the interaction notification message comprising the subscription identifier; and
send the interaction notification message to the user computing device.

11. The system of claim 10, wherein the user processor is further configured to:
process the interaction notification message to identify the first entity specified subscription plan, the interaction notification message comprising a request to authorize the interaction message;
generate an interaction notification response message, the interaction notification response message comprising the subscription identifier and a response to the request to authorize the interaction message; and
send the interaction notification response message to the second entity server.

12. The system of claim 10, wherein the user processor is further configured to:
process the interaction notification message to identify the first entity specified subscription plan, the interaction notification message confirms the occurrence of the interaction transaction; and
store the interaction notification message using the first entity specified subscription plan.

13. The system of claim 8, wherein the user processor is further configured to:
process the subscription request message to determine the first entity specified subscription plan;
modify the first entity specified subscription plan associated with the interaction details;
display the modified first entity specified subscription plan; and
wherein the confirmation message comprises the modified first entity specified subscription plan.

14. The system of claim 13, wherein the interaction notification message confirms the occurrence of the interaction transaction.

15. A plurality of non-transitory computer-readable storage mediums that collectively include a plurality of instruction sets that when executed by a corresponding plurality of processors, cause the processors to perform the operations of:
generating a message comprising a first entity identifier, interaction details, and a subscription indicator;
sending the message to a first entity server associated with the first entity identifier;
processing the message to determine a first entity specified subscription plan;
generating an interaction initiation request message, the interaction initiation request message comprising an initial interaction request, the interaction details, and the first entity specified subscription plan;
sending the interaction initiation request message to a second entity server associated with the interaction details;
generating a subscription request message comprising the first entity specified subscription plan;
sending the subscription request message to a user computing device associated with the interaction details;
displaying the first entity specified subscription plan on the user computing device;
generating a confirmation message comprising the first entity specified subscription plan and a user acknowledgment;
sending the confirmation message to the second entity server;
generating a subscription identifier identifying the first entity specified subscription plan, the subscription identifier encrypted using a public key of the second entity server;
storing the subscription identifier and the first entity specified subscription plan on the second entity server;
sending the subscription identifier to the first entity server associated with the first entity identifier;
generating periodic interaction messages based on the first entity specified subscription plan, each periodic interaction message comprising a reoccurring interaction request and the subscription identifier;
sending the periodic interaction messages to the second entity server;
decrypting the subscription identifier of each interaction message using a private key of the second entity server;
validating the reoccurring interaction request with the first entity specified subscription plan identified by the decrypted subscription plan;

generating an interaction confirmation message for each interaction message, the interaction confirmation message confirming an occurrence of an interaction transaction; and sending the interaction confirmation message to the first entity server associated with the first entity identifier.

16. The non-transitory computer-readable storage mediums of claim 15, wherein the instructions cause the processors to perform operations of:

generating an interaction notification message comprising the subscription identifier;

sending the interaction notification message to the user computing device;

processing the interaction notification message to identify the first entity specified subscription plan; and storing the subscription identifier and the first entity specified subscription plan on the user computing device.

17. The non-transitory computer-readable storage mediums of claim 15, wherein the instructions cause the processors to perform operations of:

generating an interaction notification message for each interaction message, the interaction notification message comprising the subscription identifier; and sending the interaction notification message to the user computing device.

18. The non-transitory computer-readable storage mediums of claim 17, wherein the instructions cause the processors to perform operations of:

processing the interaction notification message to identify the first entity specified subscription plan, the interaction notification message comprising a request to authorize the interaction message;

generating an interaction notification response message, the interaction notification response message comprising the subscription identifier and a response to the request to authorize the interaction message; and sending the interaction notification response message to the second entity server.

19. The non-transitory computer-readable storage mediums of claim 17, wherein the instructions cause the processors to perform operations of:

processing the interaction notification message to identify the first entity specified subscription plan, the interaction notification message confirms the occurrence of the interaction transaction; and storing the interaction notification message using the first entity specified subscription plan.

20. The non-transitory computer-readable storage mediums of claim 15, wherein the instructions cause the processors to perform operations of:

processing the subscription request message to determine the first entity specified subscription plan;

modifying the first entity specified subscription plan associated with the interaction details;

displaying the modified first entity specified subscription plan on the user computing device; and wherein the confirmation message comprises the modified first entity specified subscription plan.

\* \* \* \* \*